United States Patent
Knight et al.

(10) Patent No.: US 7,495,423 B1
(45) Date of Patent: Feb. 24, 2009

(54) APPARATUS AND METHOD FOR LOOP ADJUSTMENT FOR A DC/DC SWITCHING REGULATOR

(75) Inventors: Jonathan Knight, Tokyo (JP); Jayendar Rajagopalan, Newcastle, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/397,424

(22) Filed: Apr. 3, 2006

(51) Int. Cl.
*G05F 1/618* (2006.01)
*G05F 1/62* (2006.01)

(52) U.S. Cl. .................... 323/284; 323/259; 323/271; 323/285

(58) Field of Classification Search .................. 323/224, 323/282, 284, 285, 351, 225, 259, 268, 271, 323/344
See application file for complete search history.

(56) References Cited

U.S. PATENT DOCUMENTS

| | | | |
|---|---|---|---|
| 6,166,527 A | 12/2000 | Dwelley et al. | |
| 6,515,457 B1 | 2/2003 | Maniktala | |
| 6,580,258 B2 * | 6/2003 | Wilcox et al. | 323/282 |
| 6,680,604 B2 * | 1/2004 | Muratov et al. | 323/285 |
| 6,828,766 B2 * | 12/2004 | Corva et al. | 323/284 |
| 7,071,630 B1 * | 7/2006 | York | 315/224 |
| 7,132,818 B2 * | 11/2006 | Matsuura | 323/222 |

OTHER PUBLICATIONS

LTC3440 Data Sheet, "Micropower Synchronous Buck-Boost DC/DC Converter," Linear Technology Corporation (2001).

Chen at al., "Buck-Boost PWM Converters Having Two Independently Controlled Switches," 2001 IEEE 32nd Annual Power Electronics Specialists Conference (PESC), 2(17-21):736-741 (2001).

Cheng et al., "Chaos Study and Parameter-Space Analysis of the DC-DC Buck-Boost Converter," IEE Proc.-Electr. Power Appl., 150(2):126-138 (2003).

Feng et al., "An Adaptive Current Mode Fuzzy Logic Controller for DC-to-DC Converters," 2003 IEEE Applied Power Electronics Conference (APEC), pp. 983-989 (2003).

Gaboriault et al., "A High Efficiency, Non-Inverting, Buck-Boost DC-DC Converter," 2004 19th Annual IEEE Applied Power Electronics Conference and Exposition (APEC '04), 3:1411-1415 (2004).

Midya et al., "Tracking Power Converter for Supply Modulation of RF Power Amplifiers," 2001 IEEE 32nd Annual Power Electronics Specialists Conference (PECS), 3(17-21):1540-1545 (2001).

Midya et al., "Buck or Boost Tracking Power Converter," IEEE Power Electronics Letters, 2(4):131-134 (2004).

Nguyen et al., "A Tracking Control Method for Boost and Buck-Boost Converters Using Input Current Prediction and Load Current Feedforward," 1997 28th Annual IEEE Power Electronics Speacialists Conference (PESC), 1(22-27):189-196 (1997).

(Continued)

*Primary Examiner*—Gary L Laxton
(74) *Attorney, Agent, or Firm*—Darby & Darby P.C.; Matthew M. Gaffney

(57) ABSTRACT

A current-mode switching regulator is provided. In one embodiment, the regulator is a multi-mode buck-boost regulator that operates as follows. When the operating mode changes, a gain associated with the inner current loop changes, and the loop compensation changes. The inner current loop gain and the loop compensation are adjusted when the operating mode changes such that the post-mode change feedback variable values are roughly the same as the pre-mode change feedback variables values.

24 Claims, 13 Drawing Sheets

OTHER PUBLICATIONS

Sahu et al., "A High-Efficiency Linear RF Power Amplifier with a Power-Tracking Dynamically Adaptive Buck-Boost Supply," IEEE Transactions on Microwave Theory and Techniques, 52,(1):112-120 (2004).

Sahu et al., "A Low Voltage, Dynamic, Noninverting, Synchronous Buck-Boost Converter for Portable Applications," IEEE Transactions on Power Electronics, 19(2):443-452 (2004).

Rogers, E., "Understanding Buck-Boost Power Stages in Switch Mode Power Supplies," Texas Instruments, Application Report, SLUA059A, pp. 1-32 (2002).

Liqing et al., "Computation of Lyapunov Exponents for a Current-Programmed Buck-Boost Converter," 2nd International Workshop on Autonomous Decentralized System, 6-7:273-276 (2002).

* cited by examiner

APPARATUS AND METHOD FOR LOOP ADJUSTMENT FOR A DC/DC SWITCHING REGULATOR

FIELD OF THE INVENTION

The invention is related to converters, and in particular, to an apparatus and method for a DC-DC switching regulator in which the current loop gain is adjusted based on the operating mode.

BACKGROUND OF THE INVENTION

A buck regulator may be used to generate a regulated output voltage than is less than the input voltage; conversely, a boost converter may be used to generate a regulated output voltage that is greater than the input voltage. However, DC-DC converters with step up/step down characteristics need to be used when the input and output voltage ranges overlap. For example, a DC-DC converter may be used to convert a voltage from a battery, which may have a voltage from 4.5V to 2.5V, into an output voltage of 3.4 V to 0.8 V. Several different topologies may be used, such as SEPIC, Cuk, a buck/boost regulator, and the like.

BRIEF DESCRIPTION OF THE DRAWINGS

Non-limiting and non-exhaustive embodiments of the present invention are described with reference to the following drawings, in which.

DETAILED DESCRIPTION

Figure 1:
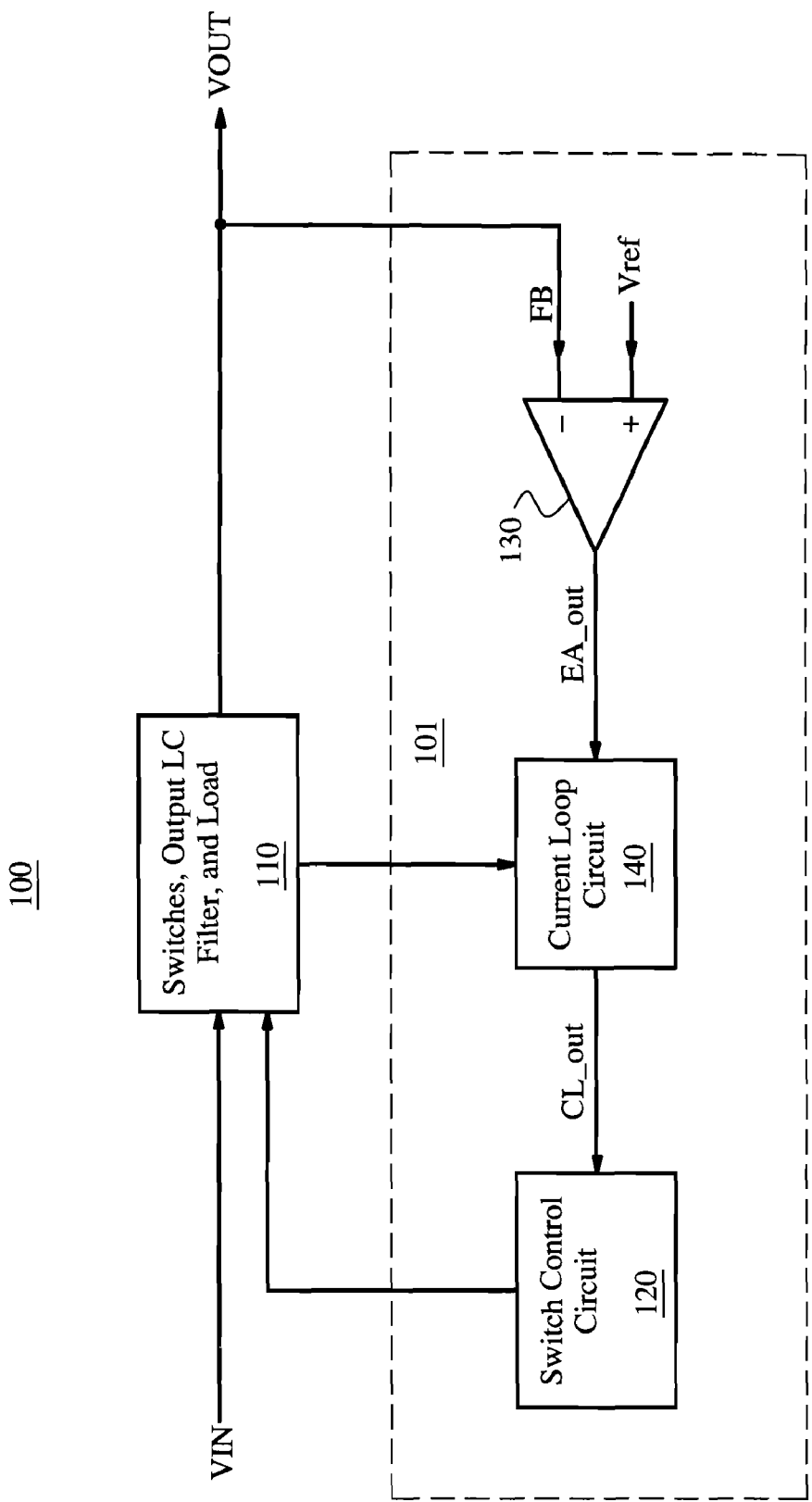
FIG. 1 illustrates a block diagram of a regulator.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is released to a current-mode switching regulator. In one embodiment, the regulator is a multi-mode buck-boost regulator that operates as follows. When the operating mode changes, a gain associated with the inner current loop changes, and the loop compensation changes. The inner current loop gain and the loop compensation are adjusted when the operating mode changes such that the post-mode change feedback variable values are roughly the same as the pre-mode change feedback variables values.

FIG. 1 illustrates a block diagram of an embodiment of regulator 100. Regulator 100 includes regulator controller 101 and block 110. Block 110 may include switches, an output LC filter, a load, and/or the like. Regulator 101 includes error amplifier 130, current loop circuit 140, and switch control circuit 120.

In operation, error amplifier 130 provides error amplifier output signal EA_out based, in part, on feedback signal FB. Feedback signal FB is based, at least in part, on output voltage VOUT and/or a load current associated with block 110. Error amplifier 130 includes compensation not shown in FIG. 1. In one embodiment, feedback signal FB is provided from signal Vout by a voltage divider. In other embodiments, signal Vout may be provided directly as signal FB. For example, in one embodiment, FB=Vout/2, and Vref=Vcom/2, where Vcom is the desired output voltage. In some embodiments, Vcom is user-configurable. In other embodiments, Vcom is fixed.

Current loop circuit 140 is operable to receive signal EA_out. Further, current loop circuit 140 is operable to sense an inductor current in block 110. Current loop circuit 140 is further operable to provide current loop output signal CL_out for the current-mode control, based at least in part on the sensed inductor current and signal EA_out.

Switch control circuit 120 is operable to control switches in block 110 based, in part, on current loop output signal CL_out to control regulation of output voltage VOUT and/or the load current.

A gain associated with current loop circuit 140 is adjustable. In some embodiments, the adjustable gain is the current sense gain. In some peak current mode embodiments, the adjustable gain is the peak current reference gain. The gain is adjusted based on the operating mode, the load current, and/ or (VIN-Vcom), wherein VIN is the input voltage, and Vcom is the command voltage (i.e., the desired output voltage to which output voltage VOUT is regulated).

In one embodiment, regulator 100 is a multi-mode buck-booster regulator. For example, in one embodiment, regulator 100 is a three-mode buck-boost regulator that operates in buck mode if VIN is significantly greater than Vcom, operates in boost mode if VIN is significantly less than Vcom, and operates in buck-boost mode if VIN is approximately equal to Vcom. In another embodiment, regulator 100 is a buck-or-boost regulator that has two operating modes, buck mode and boost mode. Buck mode, boost mode, and buck-boost mode each have a different transfer function.

In one multi-mode embodiment, when the operating mode changes, the gain is adjusted so that error amplifier output signal EA_out does not have to change significantly as a result of the operating mode change. In one embodiment, as discussed above, the adjustable gain is the current sense gain. In this embodiment, when the operating mode changes, the inductor current changes accordingly. However, the current sense gain is adjusted so that the sensed inductor current remains unchanged when the operating mode changes, even though the actual inductor current changes. This way, the error amplifier output signal EA_out does not have to change when the operating mode changes.

In average current mode control embodiments, the current sense gain is the adjusted gain. In some peak current mode control embodiments, the current sense gain is the adjusted gain.

In other peak current mode control embodiments, the adjusted gain is the peak current reference. In these embodiments, when the operating mode changes, the peak current reference changes according to the new operating mode such that signal EA_out does not have to change when the operating mode changes.

In addition to or instead of changing the gain based on an operating mode change, in some embodiments, VIN and Vcom feedforward may be applied. In these embodiments, the gain is adjusted based, at least in part, on (VIN-Vcom).

In some peak current mode control embodiments, in addition to or in place of changing the gain based on an operating mode change, the gain may be adjusted based on load current changes, so that signal EA_out does not have to change when a large change in the load current occurs.

Further, in some embodiments, compensation in the outer voltage loop and/or in the inner current loop is adjusted when a mode change occurs. By adjusting the inner current loop gain, and adjusting the feedback network compensation, the post-mode change feedback variable values are close to the pre-mode change feedback variable values. Accordingly, the roughly same phase margin and transient response may be maintained when the operating mode changes.

Figure 2:
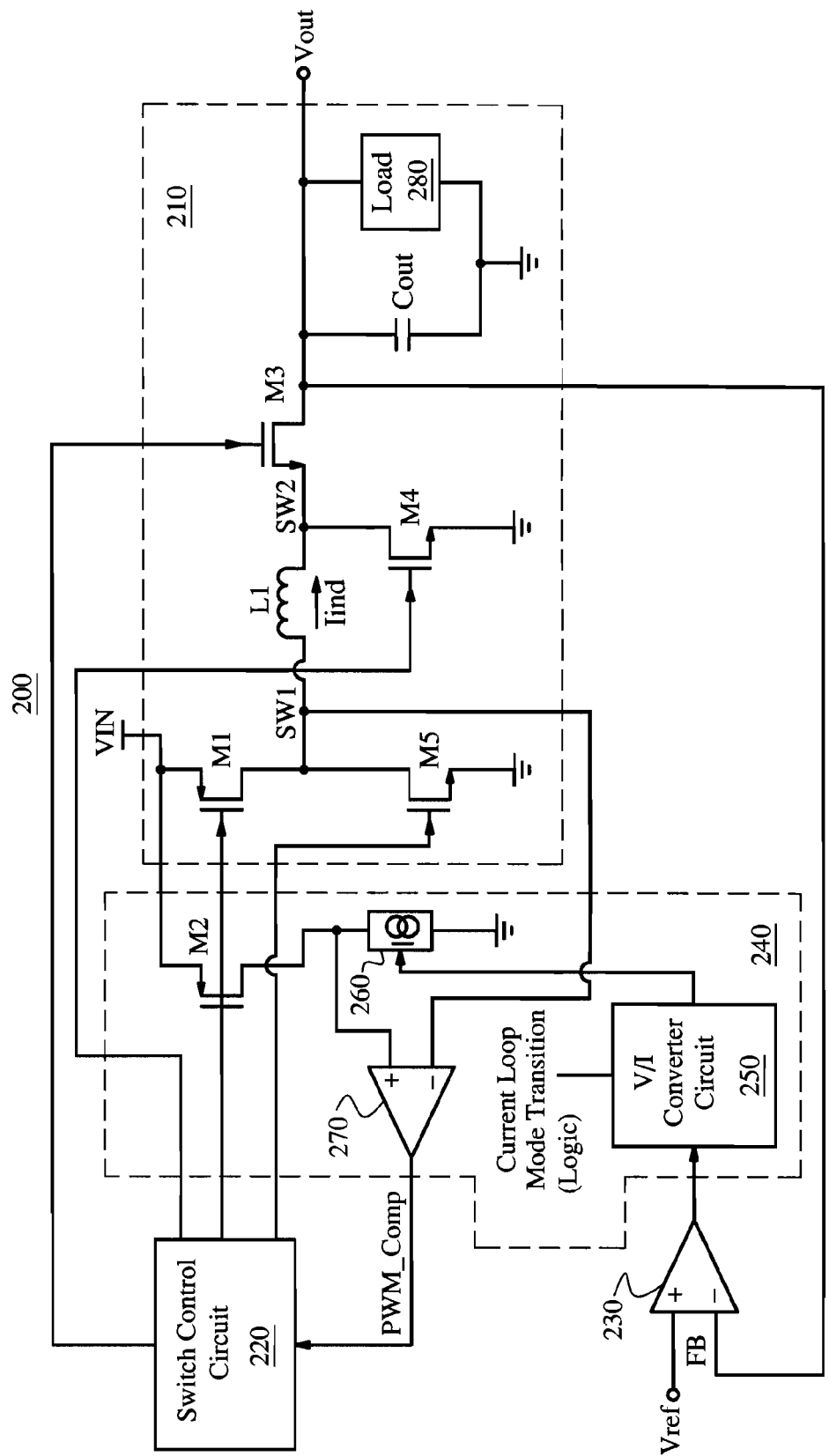
FIG. 2 shows a block diagram of an embodiment of the regulator of FIG. 1.

FIG. 2 shows a block diagram of an embodiment of regulator 200, which may be employed as an embodiment of regulator 100 of FIG. 1. Block 210 includes transistors M1, M5, M3, and M4; inductor L1; output capacitor Cout; and load 280. Current loop 240 includes V/I converter circuit 250, adjustable current source circuit 260, transistor M2, and PWM comparator 270. In one embodiment, input voltage VIN is a battery voltage (Vbat).

V/I converter circuit 250 is operable to convert error amplifier output voltage EA_out into a current. Adjustable current source circuit 260 is arranged to provide current Iref. Adjustable current source circuit 260 is arranged with the output current mirror for V/I converter circuit 250, so that the peak reference current Iref is proportional to signal EA_out. Transistor M2 is arranged as a sense transistor for transistor M1.

PWM comparator 270 is arranged to trip when inductor current Iind reaches the peak reference current Iref to provide PWM comparator output signal PWM_Comp. Signal PWM_Comp is an embodiment of signal CL_out of FIG. 1.

In one embodiment, switch control circuit 220 includes an SR latch (not shown), where signal PWM_Comp is provided at the R input of the SR latch, and clock signal CLK (not shown in FIG. 2) is provided at the S input of the SR latch. In buck mode, switch control logic circuit 220 causes transistor M3 to remain on, transistor M4 to remain off, and provides signal Q (i.e. the Q output of the SR latch, not shown in FIG. 2) to the gates of transistor M2 and M5. In boost mode, switch control logic circuit 220 causes transistor M1 to remain on, transistor M5 to remain off, and provides signal Q to the gates of transistor M4, and Qbar to the gate of transistor M3.

Figures 3A, 3B, 3C:
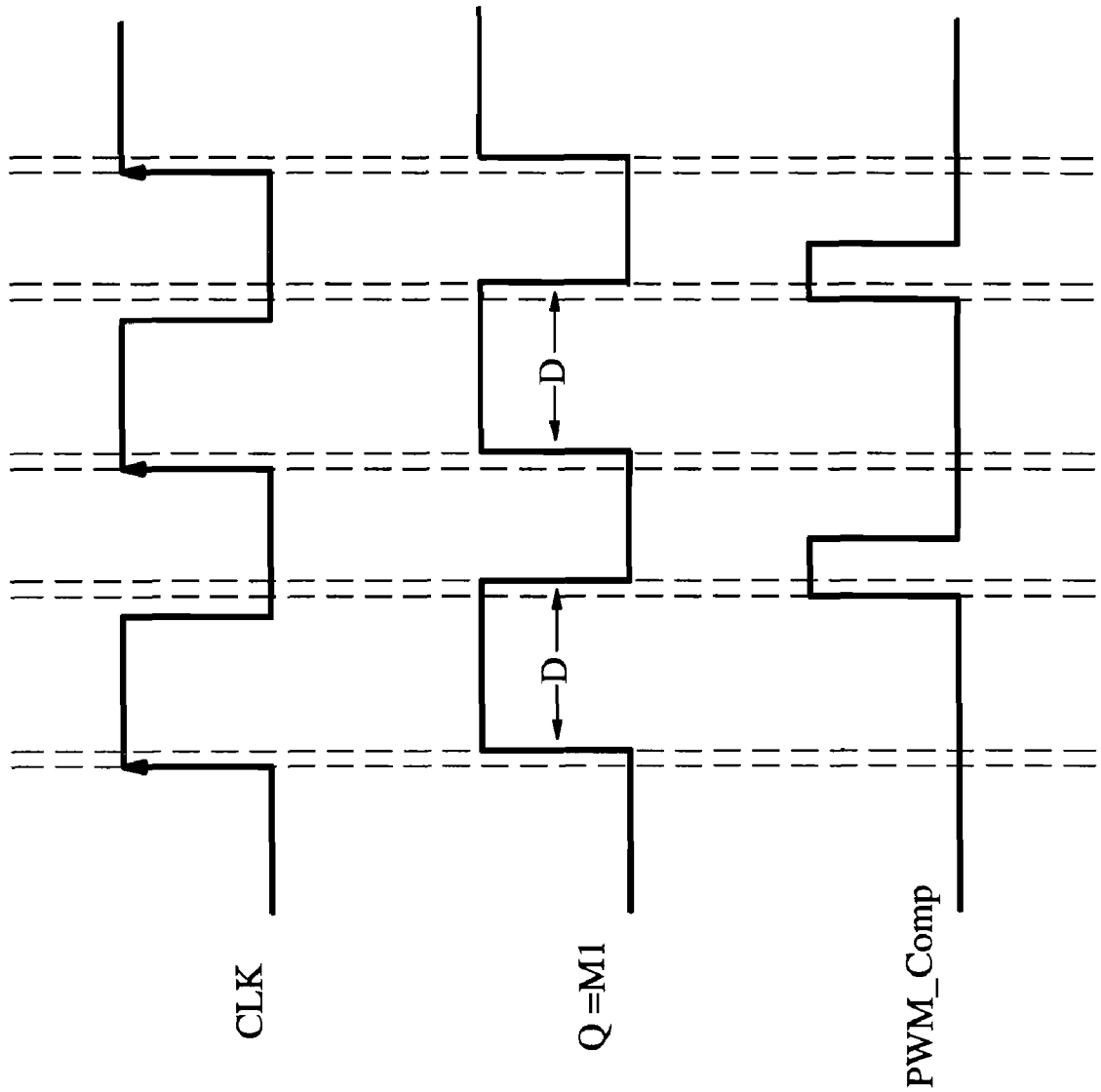
FIGS. 3A, 3B, and 3C illustrate waveforms of embodiments of signals CLK, Q, and PWM_comp respectively for an embodiment the circuit of FIG. 2 during buck mode.
Figures 4A, 4B, 4C, 4D:
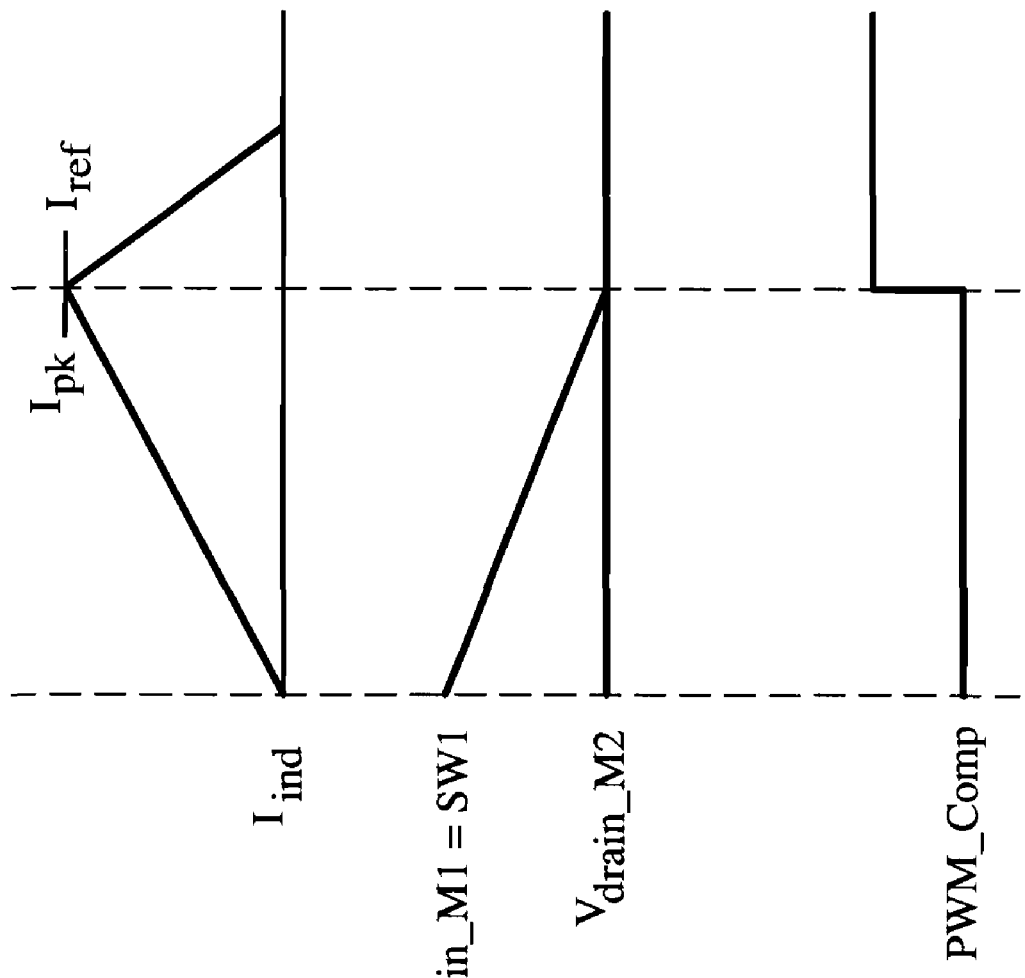
FIGS. 4A, 4B, 4C, 4D show waveforms of embodiments of signals Iind, SW1, $V_{drain\_M2}$, and PWM_Comp respectively for an embodiment the circuit of FIG. 2.

FIGS. 3A, 3B, and 3C illustrate waveforms of embodiments of signals CLK, Q, and PWM_Comp respectively, for an embodiment of circuit 200 during buck mode. As shown, signal Q, provided to the gate of transistor M1 during buck mode, goes high at the beginning of each clock pulse, turning transistor M1 on. When the PWM comparator is triggered, signal Q goes low, turning off transistor M1.

FIGS. 4A, 4B, 4C, and 4D show waveforms of embodiments of signals Iind, SW1, $V_{drain\_M2}$, and PWM_Comp, respectively, for an embodiment of regulator 200 of FIG. 2. When Iind reaches peak current Ipk, as defined by Iref, SW1 reaches voltage $V_{drain\_M2}$. At this point, the PWM comparator trips, causing signal PWM_Comp to go high.

Figures 5A, 5B:
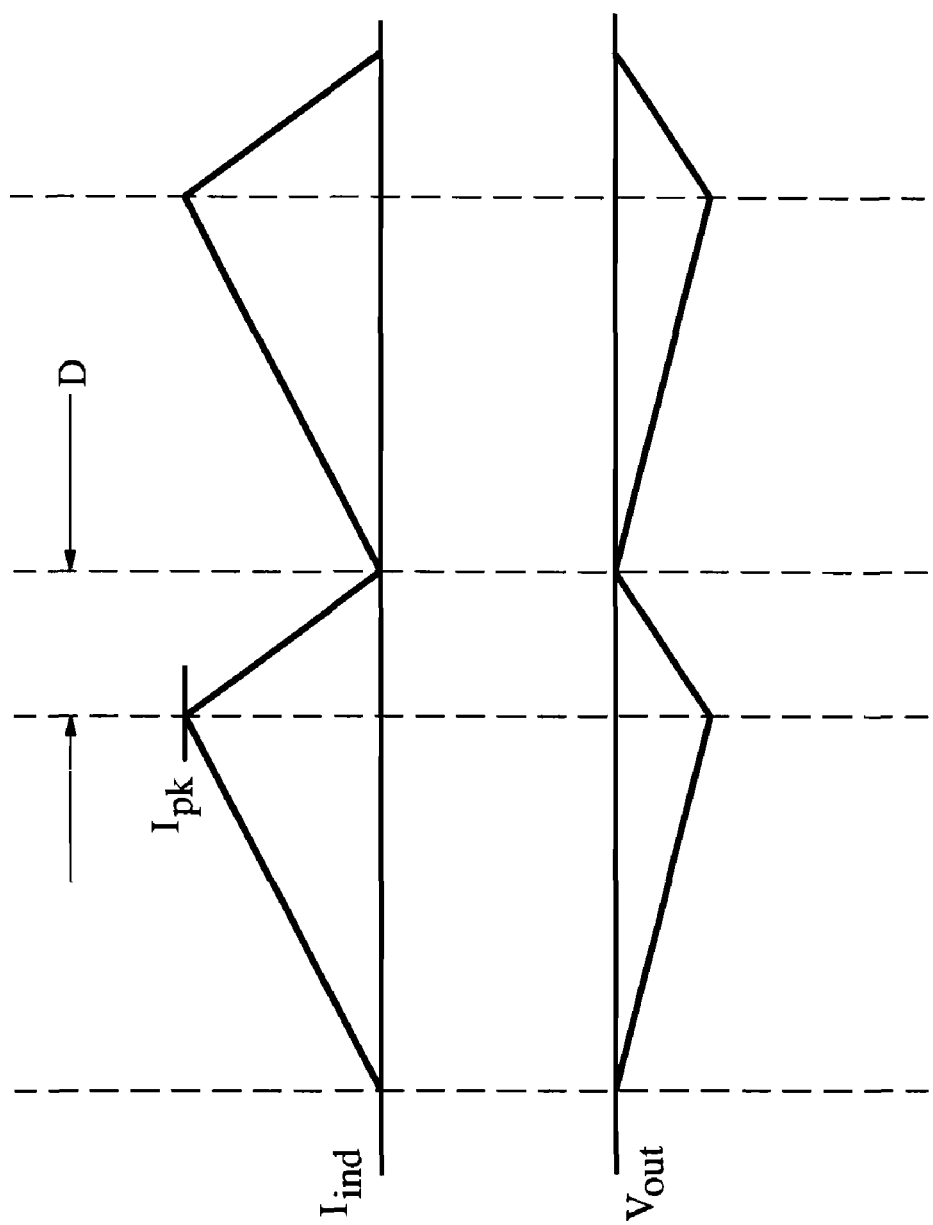
FIGS. 5A and 5B illustrate waveforms of embodiments of inductor current Iind and output voltage Vout respectively during boost mode.

FIGS. 5A and 5B illustrate waveforms of embodiments of inductor current Iind and output voltage Vout, respectively, for an embodiment of regulator 200 of FIG. 2 during boost mode. At the start of each clock cycle, inductor control Iind ramps upward until it reaches the peak current, Ipk, which is defined by Iref. Current Iind then ramps downwardly until the next clock cycle begins. When the next clock cycle beings, current Iind begins ramping upward again.

While the inductor current is rising, output voltage VOUT is falling. The percentage of time that output voltage Vout is rising during each clock cycle is defined as the duty cycle, D. As output voltage Vout gets close to input voltage VIN, D becomes smaller.

This is the opposite buck operation (not shown in FIG. 5). In buck operation, as the inductor current rises, the output voltage rises. In buck mode, as the input voltage VIN gets closer to the output voltage Vout, D becomes larger. If the operating mode changes from buck mode to boost mode, the duty cycle changes from a large duty cycle to a small duty cycle.

Referring back to FIG. 2, during a mode transistor, the gain associated with V/I converter circuit 250 is changed. For example, in one embodiment, the gain is adjusted by adjusting the ratio of an output current mirror in V/I converter circuit 250. In another embodiment, V/I converter circuit 250 includes a programmable gain amplifier (PGA) that is adjusted in order to adjust the gain. In any case, the gain is adjusted so that the reference current peak is appropriate for the new operating mode. This way, signal EA_out does not need to change as a result of the mode transition.

Figure 6:
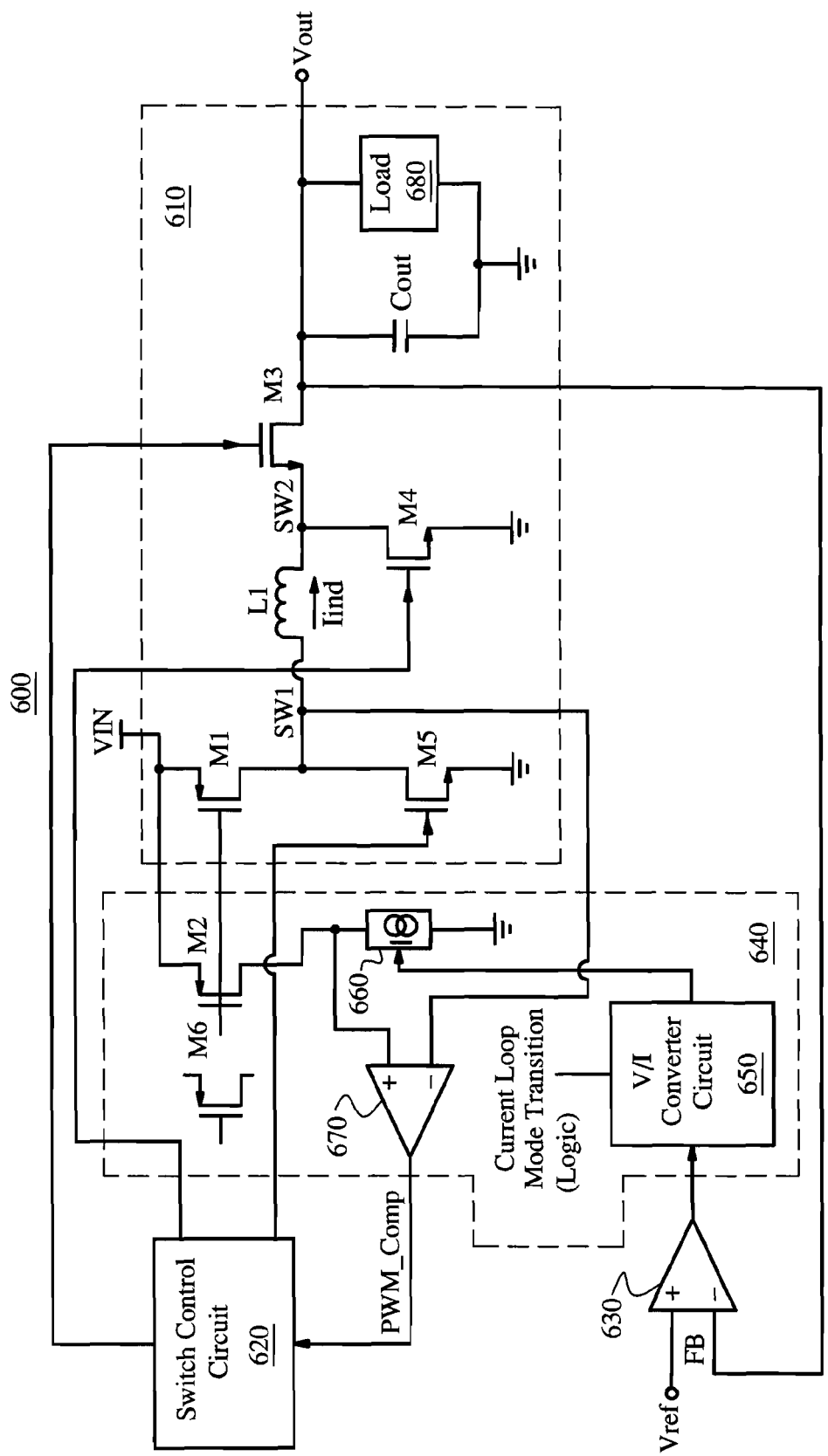
FIG. 6 shows a block diagram of an embodiment of the regulator of FIG. 2.

FIG. 6 shows a block diagram of an embodiment of regulator 600, which may be employed as an embodiment of regulator 200 of FIG. 2. Current loop 640 further includes transistor M6.

The ratio of $I_{D(M2)}/I_{D(M1)}$ is substantially equal to $W_{(M2)}/W_{(M1)}$, where $I_{D(M2)}$ represents the drain current of transistor M2, $I_{D(M1)}$ represents the drain current of transistor M1, $W_{(M2)}$ represents the channel width of transistor M2, and $W_{(M1)}$ represents the channel width of transistor M1. By changing the channel width of transistor M2, the gain of Iref can adjusted. Accordingly, changing the channel width of transistor M2 can be used for the same purpose as changing the gain of the V/I converter circuit, as described with regard to FIG. 2 above. The channel width of transistor M2 can be effectively changed by switching in transistor M6. In one embodiment, transistor M6 is switched out and transistor M2 is switched in in its place. In another embodiment, transistor M2 remains coupled to Iref and transistor M6 is switched in in parallel with transistor M2.

Figure 7:
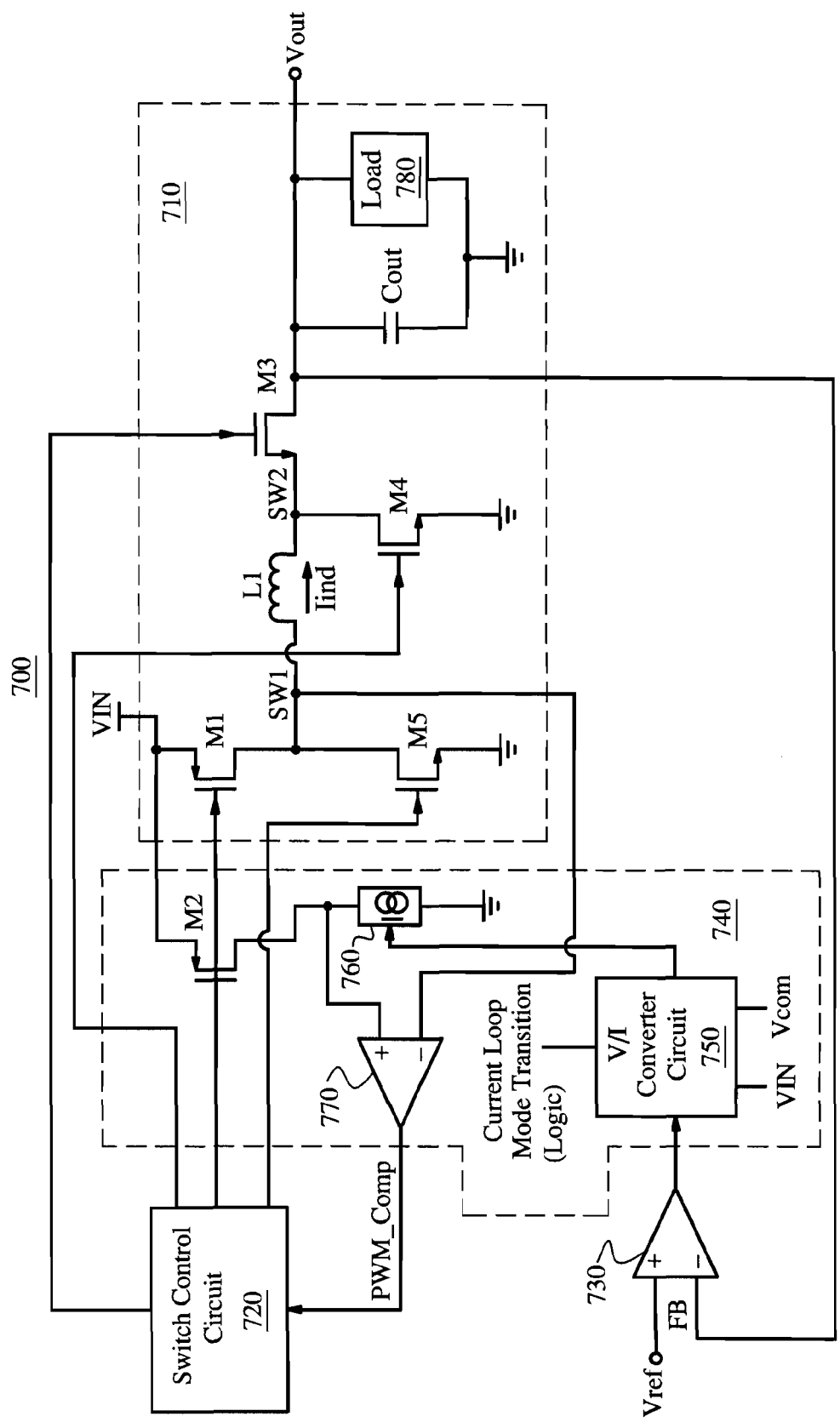
FIG. 7 illustrates a block diagram of another embodiment of the regulator of FIG. 2.

FIG. 7 illustrates a block diagram of an embodiment of regulator 700, which may be employed as an embodiment of regulator 200 of FIG. 2. V/I converter circuit 750 receives signals VIN and Vcom, and performs feedforward based on signals VIN and Vcom.

Figure 8:
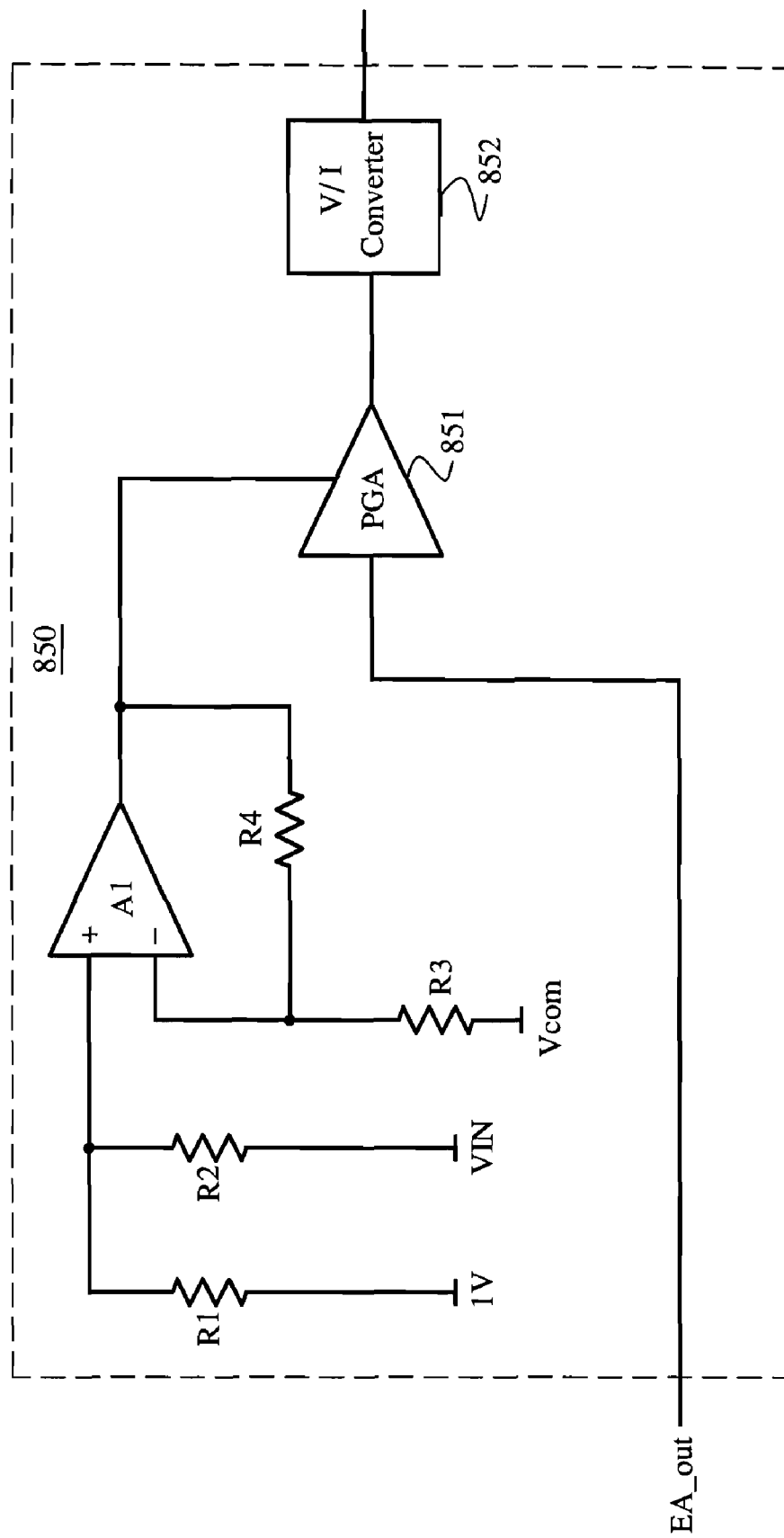
FIG. 8 shows a block diagram of an embodiment of the V/I converter circuit of FIG. 7.

FIG. 8 shows a block diagram of an embodiment of V/I converter circuit 850, which may be employed as an embodiment of V/I converter circuit 750 of FIG. 7. V/I converter circuit 850 includes op amp A1, resistors R1-R4, PGA 851, and V/I converter 852.

As discussed above, in some embodiments, the compensation of the outer voltage loop is adjustable based on a change in operating mode. This may be accomplished by changing the frequency response and/or the gain of the error amplifier. This may be accomplished in different ways in different embodiments, as shown in FIGS. 9-12 below.

Figure 9:
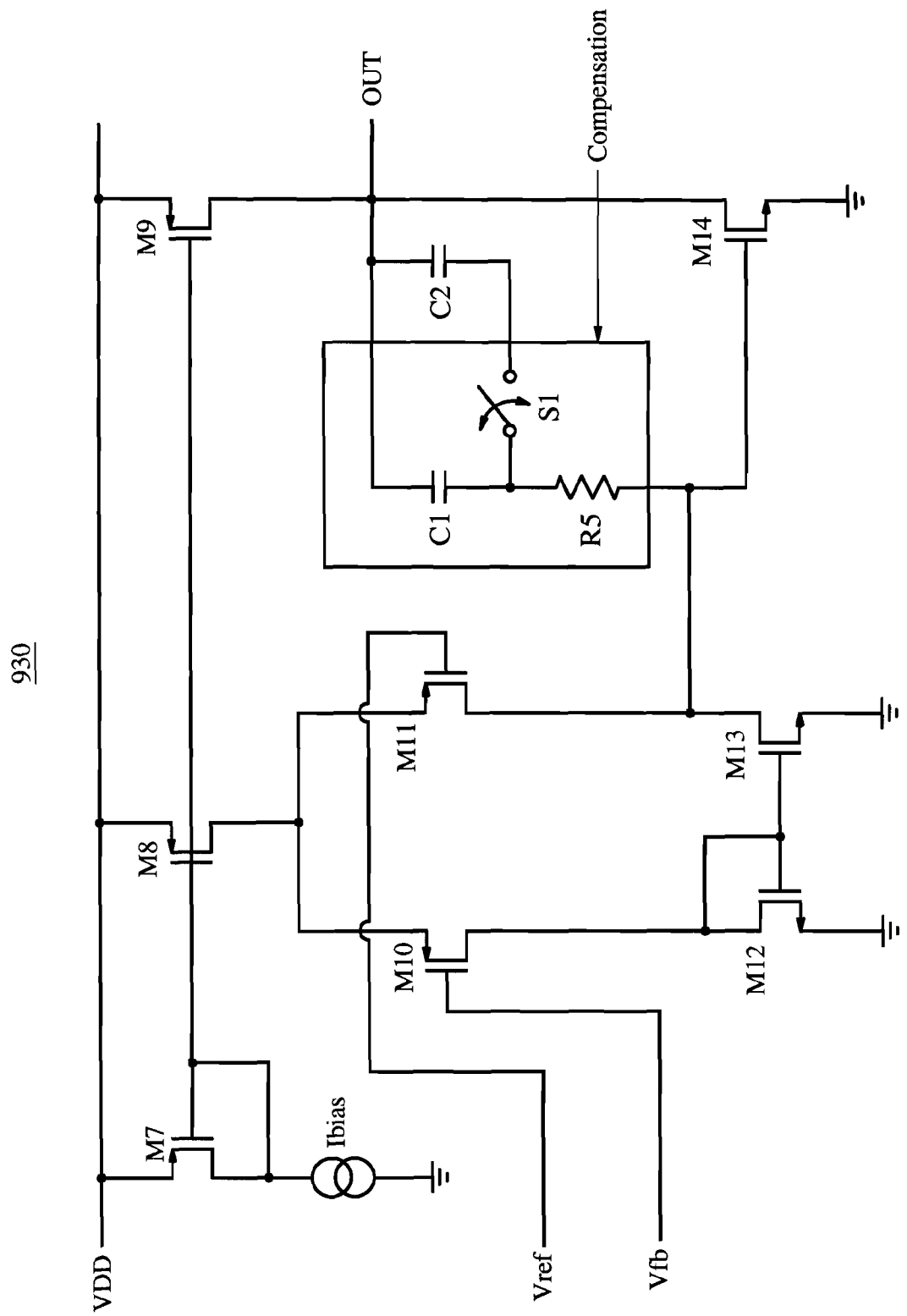
FIG. 9 schematically illustrates an embodiment of the error amplifier of FIG. 1.

FIG. 9 schematically illustrates an embodiment of error amplifier 930. Error amplifier 930 includes transistors M7-M14, current source Ibias, resistor R5, and capacitors C1 and C2. In one embodiment, the compensation network may be changed based on operating mode by opening and closing switch S1. Also, in one embodiment, the resistance (e.g. resistor R5) may also be changed based on operating mode.

Figure 10:
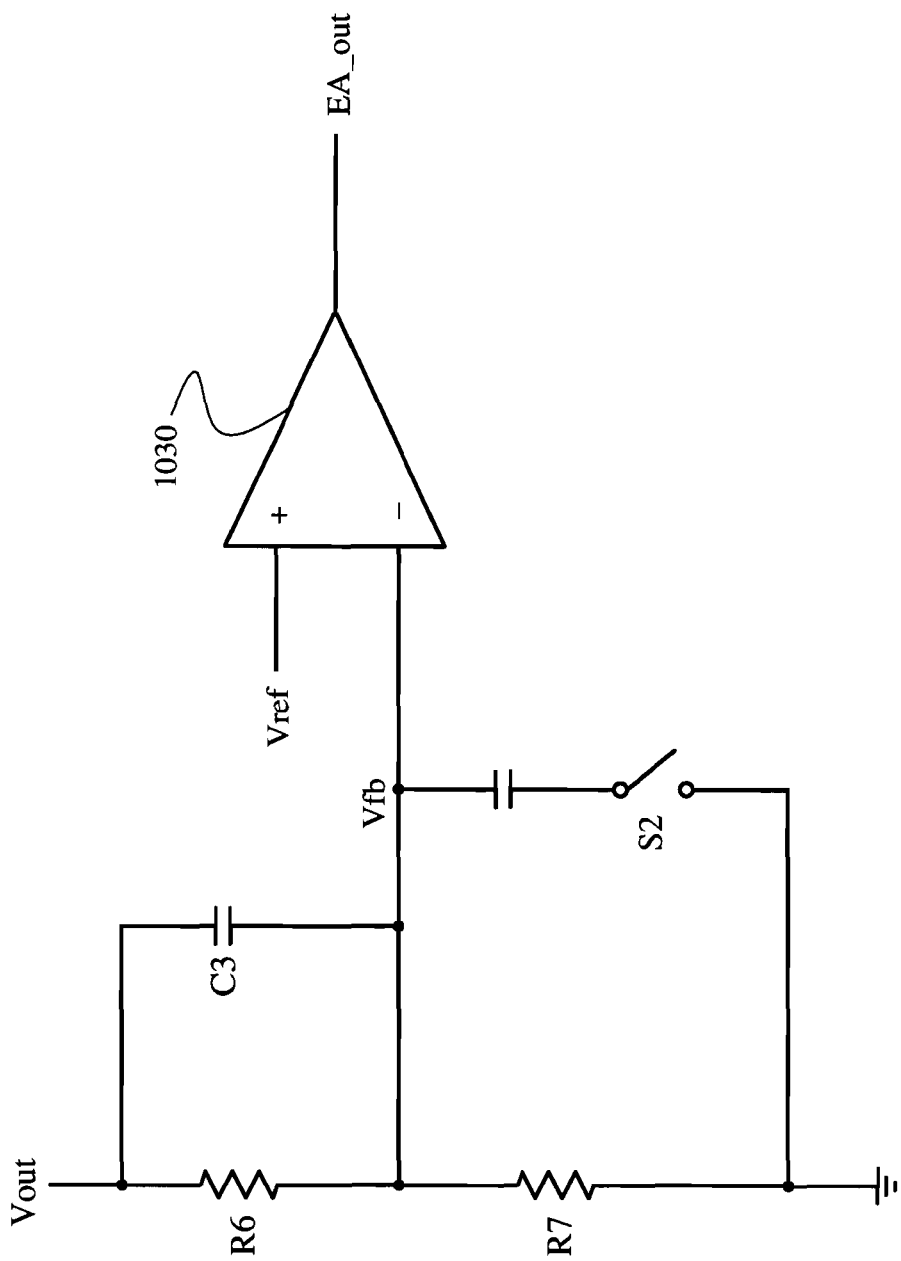
FIG. 10 illustrates a block diagram of an embodiment of the error amplifier of FIG. 1, along with embodiments of a voltage divider and compensation.

FIG. 10 schematically illustrates a block diagram of an embodiment of error amplifier 1030, along with a voltage divider and compensation. Resistors R6 and R7 are arranged as a voltage divider to provide feedback voltage Vfb from output voltage Vout. The frequency response may be changed based on operating mode by opening and closing switch S2.

Figure 11:
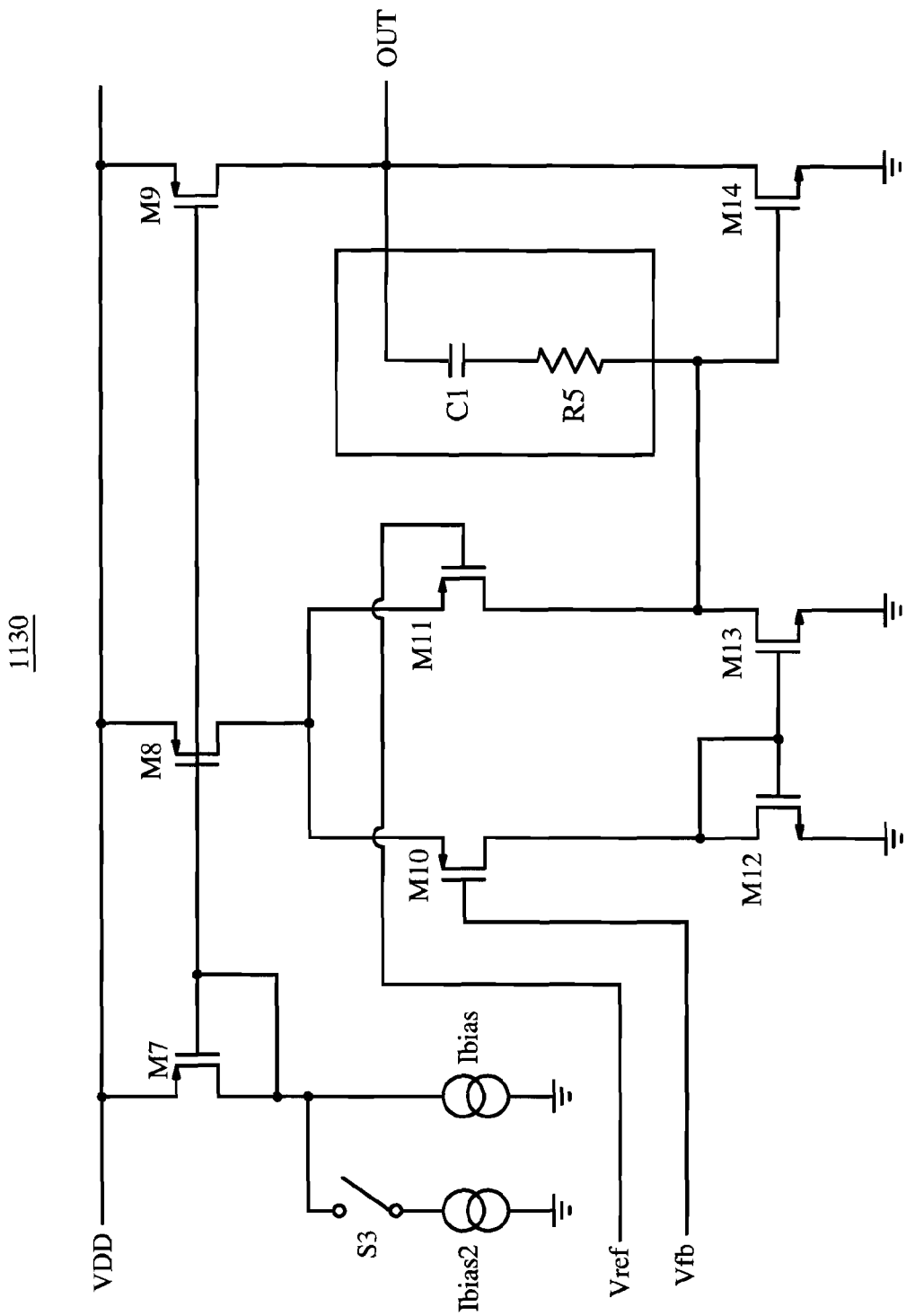
FIG. 11 shows a schematic diagram of an embodiment of the error amplifier of FIG. 9.

FIG. 11 shows a schematic diagram of an embodiment of error amplifier 1130. Error amplifier 1130 further includes current source Ibias2 and switch S3. By opening and closing switch S3, the gain of error amplifier 1130 may be changed based on operating mode.

Figure 12:
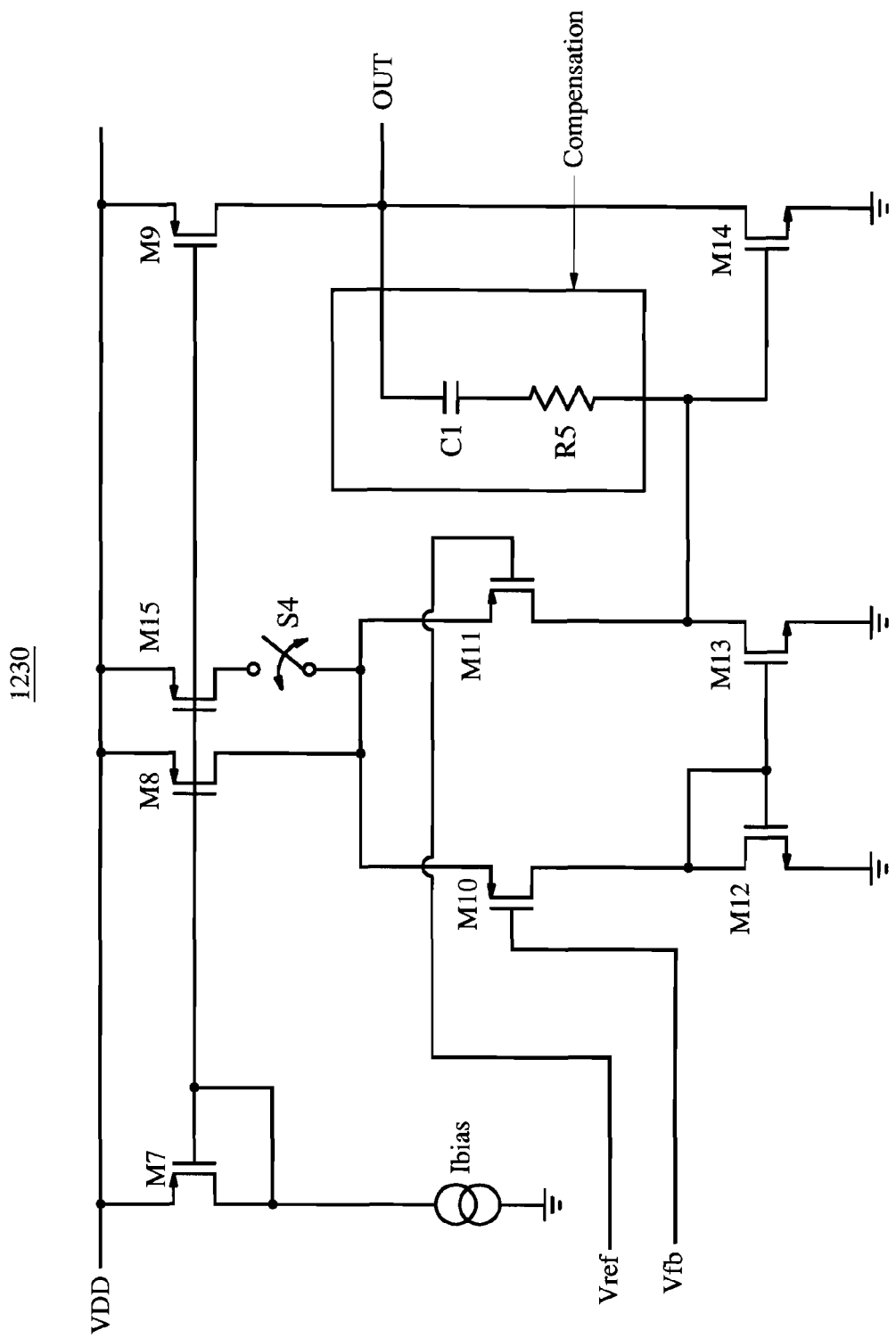
FIG. 12 schematically illustrates another embodiment of the error amplifier of FIG. 9.

FIG. 12 schematically illustrates an embodiment of error amplifier 1230. Error amplifier 1230 further includes transistor M15 and switch S4. By opening and closing switch S4, the gain of error amplifier 1230 may be changed based on operating mode.

Figure 13:
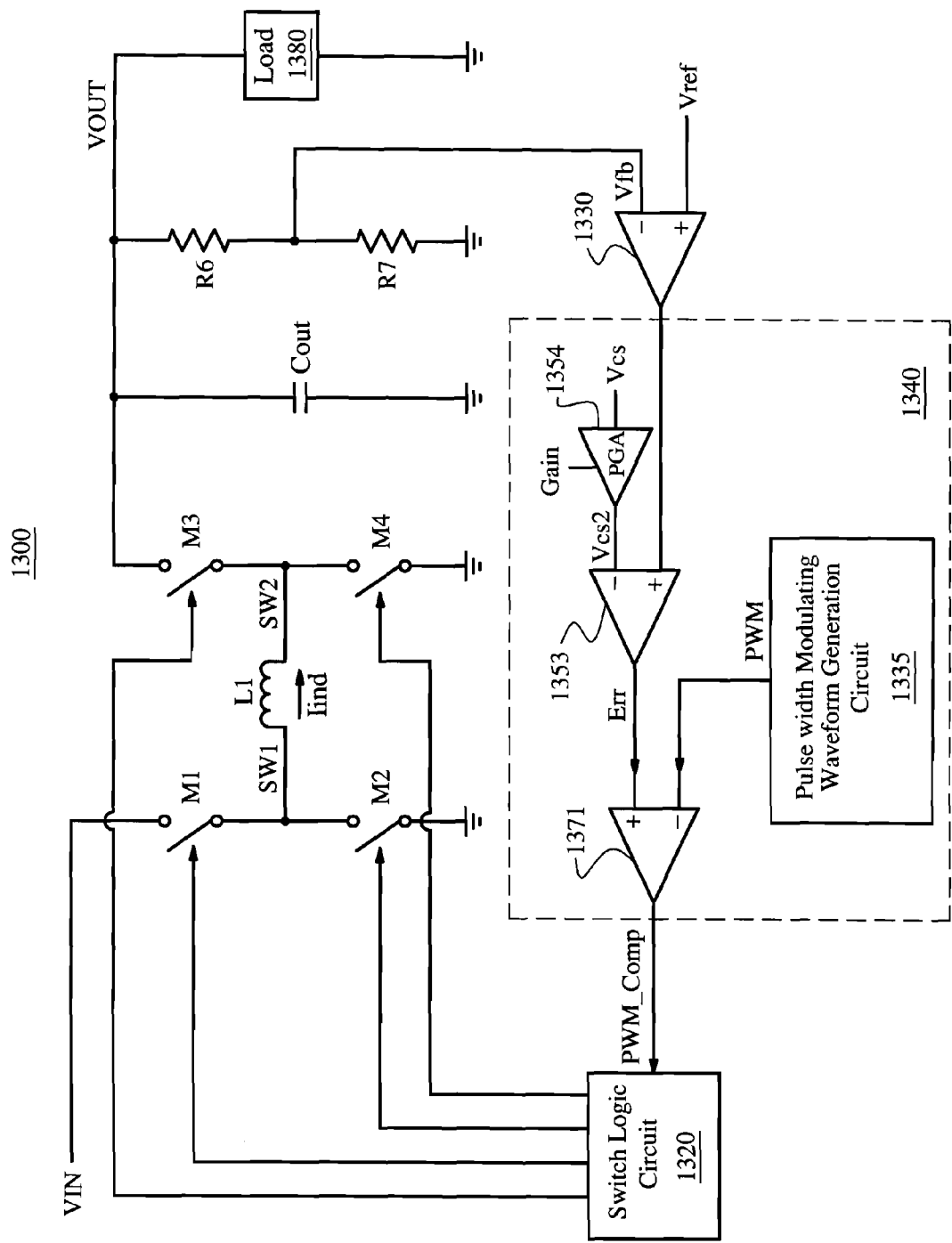
FIG. 13 shows another embodiment of the regulator of FIG. 1, arranged in accordance with aspects of the invention.

FIG. 13 shows an embodiment regulator 1300, which may be employed as an embodiment of regulator 100. Current mode loop circuit 1340 is an average current mode loop circuit, which includes PGA 1354, amplifier 1353, pulse width modulating generation circuit 1335, and PWM comparator 1371 in one embodiment. As shown in regulator 1300, the gain is adjusted by adjusting the current sense gain.

PGA 1354 is operable to receive current sense voltage Vcs, and to provide current sense voltage Vcs2 such that Vcs2=Gain*Vcs. Voltage Vcs may be provided in a different manner in different embodiments. In one embodiment, voltage Vcs is provided by using a sense transistor. In another embodiment, voltage Vcs may be provided by using a sense resistor. In another embodiment, voltage Vcs may be provided by using DCR sensing. These embodiments and others are within the scope and spirit of the invention.

In one embodiment, error amp 231 and amplifier 232 are both gm amplifiers. Pulse width modulating waveform generation circuit 250 is configured to provide signal PWM. In one embodiment, signal PWM is a sawtooth wave. In one embodiment, signal PWM is a triangle wave.

Although one embodiment of current mode circuit 1340 is illustrated in FIG. 13, many different embodiments are within the scope and spirit of the invention. For example, in one embodiment, PGA 1354 is not included in current mode circuit 1340, a sense transistor is used to provide voltage Vcs, and gain is provided by switching in a transistor with the transistor in a manner similar to that shown in FIG. 6. However, in this embodiment, unlike the circuit shown in FIG. 6, the sense transistor is coupled to a resistor to provide voltage Vcs.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for DC-DC conversion, comprising:
a current-mode switching regulator controller, including:
an error amplifier that is operable to provide an error amplifier output-signal; and
a current-mode loop circuit that is configured to sense an inductor current, and to provide an error signal based, in part, on the sensed inductor current and the error amplifier output signal, wherein the current-mode loop circuit is further configured to adjust a steady-state gain of the current-mode loop based on at least one of: a change from buck mode to boost mode; a change from boost mode to buck mode; a load current; or a difference between an input voltage and a command voltage.

2. The circuit of claim 1, wherein a compensation of at least one of an outer voltage loop compensation or the current-mode loop is adjusted if the operating mode changes.

3. The circuit of claim 1, wherein the gain is at least one of a current sense gain and a peak current reference gain.

4. The circuit of claim 1,
wherein the current-mode loop circuit includes:
a current sense circuit that is operable to provide a current sense voltage that is based, in part, on the inductor current, wherein the current sense circuit has an adjustable gain such that the current sense voltage is approximately proportional to the inductor current and further proportional to the gain; and wherein the current-mode loop circuit is configured to adjust the gain of the current loop by adjusting the gain of the current sense circuit.

5. A circuit for DC-DC conversion, comprising:
a current-mode switching regulator controller, including:
an error amplifier that is operable to provide an error amplifier output-signal; and
a current-mode loop circuit that is configured to sense an inductor current, and to provide an error signal based, in part, on the sensed inductor current and the error amplifier output signal, wherein the current-mode loop circuit is further configured to adjust a gain of the current-mode loop based on at least one of: an operating mode of the controller; a load current; or a difference between an input voltage and a command voltage, wherein the error amplifier is configured such that at least one of a gain or a frequency response of the error amplifier is adjusted if the operating mode of the controller changes.

6. A circuit for DC-DC conversion, comprising:
a current-mode switching regulator controller, including:
- an error amplifier that is operable to provide an error amplifier output-signal; and
- a current-mode loop circuit that is configured to sense an inductor current, and to provide an error signal based, in part, on the sensed inductor current and the error amplifier output signal, wherein the current-mode loop circuit is further configured to adjust a gain of the current-mode loop based on at least one of: a change from buck mode to boost mode; a change from boost mode to buck mode; a load current; or a difference between an input voltage and a command voltage, wherein the current-mode loop circuit includes:
  - a first transistor that is arranged to operate as a sense transistor to sense the inductor current, wherein the first transistor has a drain, a gate, and a source;
  - a second transistor having a drain, a gate, and a source, wherein the source of the second transistor is coupled to the source of the first transistor; and
  - a plurality of switches that are arranged to switch the second transistor in place of the first transistor to adjust the gain of the current-mode loop.

7. A circuit for DC-DC conversion, comprising:
a current-mode switching regulator controller, including:
- an error amplifier that is operable to provide an error amplifier output-signal; and
- a current-mode loop circuit that is configured to sense an inductor current, and to provide an error signal based, in part, on the sensed inductor current and the error amplifier output signal, wherein the current-mode loop circuit is further configured to adjust a gain of the current-mode loop based on at least one of: a change from buck mode to boost mode; a change from boost mode to buck mode; a load current; or a difference between an input voltage and a command voltage, wherein the current-mode loop circuit includes:
  - a first transistor that is arranged to operate as a sense transistor to sense the inductor current, wherein the first transistor has a drain, a gate, and a source;
  - a second transistor having a drain, a gate, and a source, wherein the source of the second transistor is coupled to the source of the first transistor; and
  - a plurality of switches that are arranged to couple the second transistor in parallel with the first transistor to adjust the gain of the current-mode loop.

8. A circuit for DC-DC conversion, comprising:
a current-mode switching regulator controller, including:
- an error amplifier that is operable to provide an error amplifier output-signal; and
- a current-mode loop circuit that is configured to sense an inductor current, and to provide an error signal based, in part, on the sensed inductor current and the error amplifier output signal, wherein the current-mode loop circuit is further configured to adjust a gain of the current-mode loop based on at least one of: an operating mode of the controller; a load current; or a difference between an input voltage and a command voltage, wherein the current-mode switching regulator controller operates according to at least two operating modes, the operating modes includes buck mode and boost mode, the error amplifier includes compensation that is adjustable, and wherein the compensation is adjusted if the operating mode of the current-mode switching regulator controller changes.

9. The circuit of claim 8, wherein the at least two operating modes further include buck-boost mode.

10. A circuit for DC-DC conversion, comprising:
a current-mode switching regulator controller, including:
- an error amplifier that is operable to provide an error amplifier output signal;
- a current-mode loop circuit that is configured to sense an inductor current, and to provide an error signal based, in part, on the sensed inductor current and the error amplifier output signal, wherein the current-mode loop circuit is further configured to adjust a gain of the current-mode loop based on at least one of: an operating mode of the controller; a load current; or a difference between an input voltage and a command voltage;
a first switch that is coupled between an input voltage node and a first inductor node, wherein the first switch circuit is arranged to receive the input voltage at the input voltage node;
a second switch that is coupled between the first inductor node and a ground node;
a third switch that is coupled between an output voltage node and a second inductor node, wherein the output voltage is provided at the output voltage node; and
a fourth switch circuit that is coupled between the second inductor node and the ground node;
wherein the current-mode loop circuit is operable to provide a current loop output signal, and current-mode switching regulator controller further includes a switch control circuit, and wherein the switch control circuit is operable to control the first, second, third, and fourth switches based, at least in part, on the current-mode loop output signal.

11. The circuit of claim 10, further comprising:
a first sense transistor having at least a gate, a drain and a source, wherein the first switch includes a power transistor, wherein the source of the first sense transistor is coupled to the source of the power transistor;
a second sense transistor having at least a gate, a drain, and a source, wherein the source of the second sense transistor is coupled to the source of the first transistor; and
a fifth switch that is coupled between the gate of the first sense transistor and the gate of the second sense transistor.

12. A circuit for DC-DC conversion, comprising:
a current-mode switching regulator controller, including:
- an error amplifier that is operable to provide an error amplifier output-signal; and
- a current-mode loop circuit that is configured to sense an inductor current, and to provide an error signal based, in part, on the sensed inductor current and the error amplifier output signal, wherein the current-mode loop circuit is further configured to adjust a gain of the current-mode loop based on at least one of: an operating mode of the controller; a load current; or a difference between an input voltage and a command voltage, wherein the current-mode loop circuit includes:
  - a voltage-to-current converter circuit that is operable to convert the error amplifier output voltage into a voltage-to-current converter output current, wherein the voltage-to-current converter circuit is configured such that a gain of the voltage-to-current converter circuit is adjustable, and wherein the current-mode loop circuit is configured to adjust the gain of the current-mode loop, at least in part, by adjusting the gain of the voltage-to-current converter circuit.

13. The circuit of claim 12, wherein the current-mode loop circuit is configured to adjust a gain of the voltage-to-current converter circuit if the operating mode changes.

14. The circuit of claim 12, wherein the voltage-to-current converter circuit is operable to receive the input voltage and the command voltage, and wherein the voltage-to-current converter circuit is operable to adjust the gain of the voltage-to-current converter circuit based on the difference between the input voltage and the command voltage.

15. The circuit of claim 12,
wherein the current-mode loop circuit includes:
a first transistor that is arranged to operate as a sense transistor to sense the inductor current, wherein the first transistor has a drain, a gate, and a source;
an adjustable current source that is coupled to the drain of the first transistor, wherein the voltage-to-current converter circuit is arranged to control the adjustable current source.

16. A circuit for DC-DC conversion, comprising:
a current-mode switching regulator controller, including:
an error amplifier that is operable to provide an error amplifier output-signal; and
a current-mode loop circuit that is configured to sense an inductor current, and to provide an error signal based, in part, on the sensed inductor current and the error amplifier output signal, wherein the current-mode loop circuit is further configured to adjust a gain of the current-mode loop based on the operating mode of the controller, wherein the gain is at least one of a current sense gain or a peak current reference gain, and wherein the gain is adjusted if the operating mode of the controller changes from a boost mode to a buck mode.

17. The circuit of claim 16, wherein the error amplifier is configured such that at least one of a gain or a frequency response of the error amplifier is adjusted if the operating mode of the controller changes.

18. The circuit of claim 16, wherein a compensation of at least one of an outer voltage loop compensation or an current-mode loop is adjusted if the operating mode changes.

19. A method for DC-DC conversion, comprising:
providing an error amplifier output signal that is based, at least on part, on an output voltage;
sensing an inductor current;
providing a current loop reference based, at least in part, on the error amplifier output signal;
providing a pulse width modulation output signal by performing pulse width modulating that is based, at least in part, on the current loop reference and the second inductor current;
regulating the output voltage by opening and closing a plurality of switches based, at least in part, on the pulse width modulation output signal; and
adjusting at least one of a current sense gain or a current loop reference gain based on at least one of: a change from buck mode to boost mode; or a change from boost mode to buck mode.

20. The method of claim 19, further comprising, if the operating mode of the output voltage regulation changes, adjusting at least one of an outer voltage loop compensation or a current-mode lop compensation.

21. A circuit for DC-DC conversion, comprising:
a current-mode switching regulator controller, including:
an error amplifier that is operable to provide an amplifier output-signal; and
a current-mode loop circuit that is configured to sense an inductor current, and to provide an error signal based, in part, on the sensed inductor current and the error amplifier output signal, wherein the current-mode loop circuit is further configured to adjust a gain of the current-mode loop based on at least one of: a change from buck mode to boost mode; a change from boost mode to buck mode; a load current; or a difference between an input voltage and a command voltage, wherein the current-mode switching regulator controller is a buck-or-boost current-mode switching regulator controller that is arranged to operate in boost mode and buck mode, and further arranged to adjust the gain of the current-mode loop if the operating mode changes from boost mode to buck mode or vice versa.

22. The circuit of claim 21, wherein the buck-or-boost current-mode switching regulator controller is arranged to adjust the gain of the current-mode loop if the operating mode changes from boost mode to buck mode or vise versa such that the error amplifier output signal remains substantially unchanged by the operating mode change.

23. A circuit for DC-DC conversion, comprising:
a current-mode switching regulator controller, including:
an error amplifier that is operable to provide an amplifier output-signal; and
a current-mode loop circuit that is configured to sense an inductor current, and to provide an error signal based, in part, on the sensed inductor current and the error amplifier output signal, wherein the current-mode loop circuit is further configured to adjust a gain of the current-mode loop based on at least one of: an operating mode of the controller; a load current; or a difference between an input voltage and a command voltage, wherein the current-mode switching regulator controller is a buck-boost current-mode switching regulator controller that is arranged to operate in three operating modes including boost mode, buck mode, and buck-boost mode; and further arranged to adjust the gain of the current-mode loop if the operating mode changes from one of the operating modes to another.

24. The circuit of claim 23, wherein the buck-boost current-mode switching regulator controller is arranged to adjust the gain of the current-mode loop if the operating mode changes from one of the three operating modes to another such that the error amplifier output signal remains substantially unchanged by the operating mode change.

* * * * *

UNITED STATES PATENT AND TRADEMARK OFFICE
CERTIFICATE OF CORRECTION

PATENT NO. : 7,495,423 B1
APPLICATION NO. : 11/397424
DATED : February 24, 2009
INVENTOR(S) : Jonathan Knight et al.

It is certified that error appears in the above-identified patent and that said Letters Patent is hereby corrected as shown below:

On the title page, item (56), under "Other Publications", column 2, lines 20-21, delete "Speacialists" and insert -- Specialists --, therefor.

In column 1, line 37, delete "4D" and insert -- and 4D --, therefor.

In column 1, line 38, delete "$V_{drain-M2}$," and insert -- $V_{drain\_M2}$, --, therefor.

In column 1, line 64, delete "wherein" and insert -- where --, therefor.

In column 2, line 26, delete "released" and insert -- related --, therefor.

In column 3, line 5, delete "booster" and insert -- boost --, therefor.

In column 4, line 17, after "Comp" insert -- , --.

In column 4, line 24, delete "$V_{drain-M2}$," and insert -- $V_{drain\_M2}$, --, therefor.

In column 4, line 27, delete "$V_{drain-M2}$." and insert -- $V_{drain\_M2}$. --, therefor.

In column 4, line 32, delete "control" and insert -- current --, therefor.

In column 4, line 34, delete "downwardly" and insert -- downward --, therefor.

In column 4, line 42, after "opposite" insert -- of --.

In column 4, line 49, delete "transistor," and insert -- transition, --, therefor.

In column 5, line 26, delete "below," and insert -- below. --, therefor.

In column 8, line 27, in Claim 10, delete "and" and insert -- the --, therefor.

In column 9, line 49, in Claim 19, delete "second" and insert -- sensed --, therefor.

In column 10, line 4, in Claim 20, delete "lop" and insert -- loop --, therefor.

UNITED STATES PATENT AND TRADEMARK OFFICE
CERTIFICATE OF CORRECTION

PATENT NO.         : 7,495,423 B1
APPLICATION NO.    : 11/397424
DATED              : February 24, 2009
INVENTOR(S)        : Jonathan Knight et al.

It is certified that error appears in the above-identified patent and that said Letters Patent is hereby corrected as shown below:

In column 10, line 7, in Claim 21, delete "an amplifier" and insert -- an error amplifier --, therefor.

In column 10, line 28, in Claim 22, delete "vise" and insert -- vice --, therefor.

In column 10, line 33, in Claim 23, delete "an amplifier" and insert -- an error amplifier --, therefor.

In column 10, line 49, in Claim 23, after "the" insert -- three --.

Signed and Sealed this

Twenty-seventh Day of October, 2009

David J. Kappos
*Director of the United States Patent and Trademark Office*